(12) United States Patent
Niu et al.

(10) Patent No.: US 9,971,511 B2
(45) Date of Patent: *May 15, 2018

(54) HYBRID MEMORY MODULE AND TRANSACTION-BASED MEMORY INTERFACE

(71) Applicant: SAMSUNG ELECTRONICS CO., LTD., Suwon-si, Gyeonggi-do (KR)

(72) Inventors: Dimin Niu, Sunnyvale, CA (US); Mu-Tien Chang, San Jose, CA (US); Hongzhong Zheng, Sunnyvale, CA (US)

(73) Assignee: Samsung Electronics Co., Ltd. (KR)

( * ) Notice: Subject to any disclaimer, the term of this patent is extended or adjusted under 35 U.S.C. 154(b) by 49 days.

This patent is subject to a terminal disclaimer.

(21) Appl. No.: 15/017,391

(22) Filed: Feb. 5, 2016

(65) Prior Publication Data

US 2017/0192686 A1 Jul. 6, 2017

Related U.S. Application Data

(60) Provisional application No. 62/275,617, filed on Jan. 6, 2016.

(51) Int. Cl.
*G06F 3/06* (2006.01)

(52) U.S. Cl.
CPC .......... *G06F 3/0608* (2013.01); *G06F 3/0631* (2013.01); *G06F 3/0641* (2013.01); *G06F 3/0644* (2013.01); *G06F 3/0685* (2013.01)

(58) Field of Classification Search
None
See application file for complete search history.

(56) References Cited

U.S. PATENT DOCUMENTS

| | | | |
|---|---|---|---|
| 7,716,411 B2 | 5/2010 | Panabaker et al. | |
| 8,089,795 B2 | 1/2012 | Rajan et al. | |
| 8,397,013 B1 | 3/2013 | Rosenband et al. | |
| 8,417,869 B2 | 4/2013 | Chen | |
| 8,700,949 B2 | 4/2014 | Eleftheriou et al. | |
| 8,782,336 B2 | 7/2014 | Sutardja et al. | |
| 8,874,831 B2 | 10/2014 | Lee et al. | |
| 8,914,568 B2 | 12/2014 | Chinnaswamy et al. | |
| 9,460,791 B1* | 10/2016 | Shallal | G11C 5/04 |
| 9,639,281 B1* | 5/2017 | Shallal | G06F 3/0611 |
| 2009/0313416 A1* | 12/2009 | Nation | G06F 12/0638 711/100 |
| 2013/0329491 A1 | 12/2013 | Chang et al. | |
| 2013/0332660 A1* | 12/2013 | Talagala | G06F 12/0246 711/103 |

(Continued)

FOREIGN PATENT DOCUMENTS

WO 2015070110 A2 5/2015

*Primary Examiner* — Kevin Verbrugge
(74) *Attorney, Agent, or Firm* — Innovation Counsel LLP

(57) ABSTRACT

A hybrid module includes one or more memory modules, each of which includes one or more memory devices and a memory controller, one or more storage modules, each of which includes one or more storage devices and a storage controller. A host interface of the hybrid module includes a main controller and provides an interface with the memory controller and the storage controller. A transaction-based memory interface provides an interface between the main controller and a host memory controller.

20 Claims, 5 Drawing Sheets

(56) References Cited

U.S. PATENT DOCUMENTS

| | | | |
|---|---|---|---|
| 2014/0032818 A1 | 1/2014 | Chang et al. | |
| 2014/0129788 A1 | 5/2014 | Cho | |
| 2014/0325134 A1 | 10/2014 | Carpenter et al. | |
| 2015/0046631 A1 | 2/2015 | Prather | |
| 2015/0058525 A1 | 2/2015 | Venkata | |
| 2015/0169238 A1* | 6/2015 | Lee | G06F 12/0871 711/103 |
| 2016/0335001 A1* | 11/2016 | Heller | G06F 3/0613 |
| 2016/0378344 A1* | 12/2016 | Nachimuthu | G06F 3/065 711/103 |
| 2016/0378623 A1* | 12/2016 | Kumar | G06F 3/0685 714/3 |
| 2017/0109058 A1* | 4/2017 | Shallal | G06F 3/0611 |
| 2017/0200498 A1* | 7/2017 | Shallal | G11C 14/0018 |

* cited by examiner

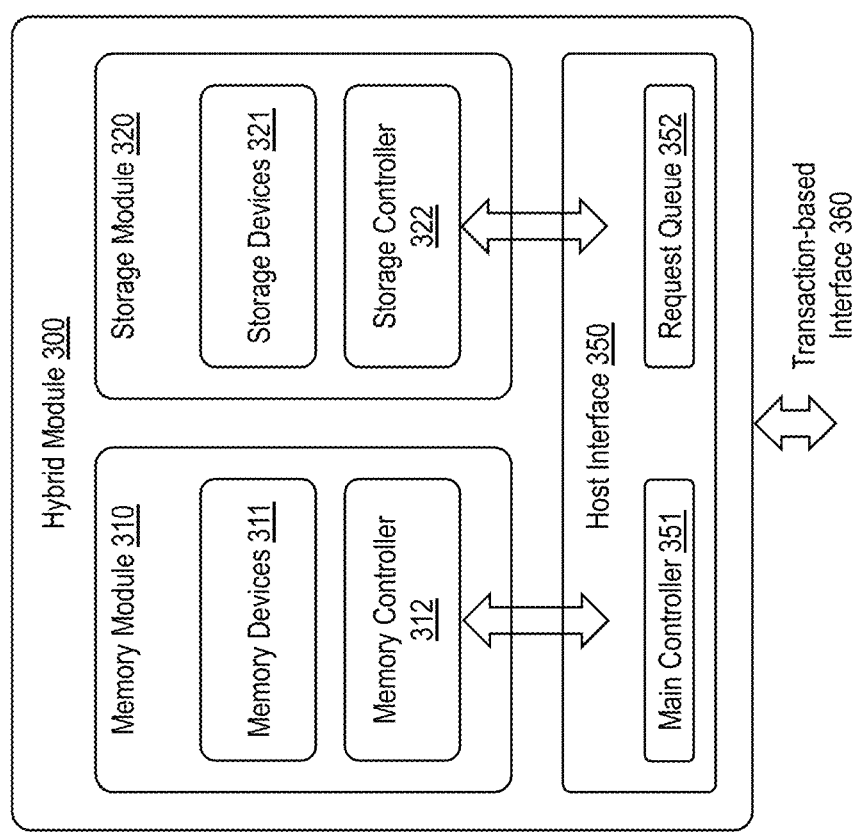

HYBRID MEMORY MODULE AND TRANSACTION-BASED MEMORY INTERFACE

CROSS-REFERENCE TO RELATED APPLICATION(S)

This application claims the benefit of and priority to U.S. Provisional Patent Application Ser. No. 62/275,617 filed Jan. 6, 2016, the disclosure of which is incorporated herein by reference in its entirety.

TECHNICAL FIELD

The present disclosure relates generally to memory systems, more particularly, a hybrid memory module and a transaction-based memory interface for interfacing with the hybrid memory module.

BACKGROUND

A transaction-based memory interface is one of the choices for interfacing with a variety of memory and storage devices. The transaction-based memory interface provides design flexibility because a memory controller of a host computer and the coupled memory and storage device communicate with each other via asynchronous messages. The transaction-based memory interface can support higher memory capacity and higher bandwidth for memory devices or storage devices. The transaction-based memory interface can also be used as an interface for input/output (I/O) ports to provide connectivity between various types of electronic devices.

Typically, a generic transaction-based interface designed for memory and storage modules provides discrete interfaces for the memory and storage modules. The number of modules that can be coupled to a host computer is determined by the predetermined number of links supported by the interface. FIG. 1 shows an example of such a generic transaction-based interface. The transaction-based interface 110 has a total of n+m interface links including a first set of interface links for memory modules 1-$n$ and a second set of interface links for storage modules 1-$m$. In a typical system, memory and storage modules reside in a discrete module and operate in a memory address space and a storage address space, respectively.

SUMMARY

According to one embodiment, a hybrid module includes one or more memory modules, each of which includes one or more memory devices and a memory controller, one or more storage modules, each of which includes one or more storage devices and a storage controller. A host interface of the hybrid module includes a main controller and provides an interface with the memory controller and the storage controller. A transaction-based memory interface provides an interface between the main controller and a host memory controller.

According to one embodiment, a method for providing a universal transaction-based memory interface includes: receiving a memory transaction requests for a memory module from a host computer; receiving a storage transaction request for a storage module from the host computer; performing the memory transaction request and the storage transaction request; and providing a host interface for interfacing with a host memory controller of the host computer via a transaction-based memory interface. The memory module and the storage module are collocated in a single module.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

FIG. 3 shows an example architecture of a hybrid memory module, according to one embodiment;

Figure 1:
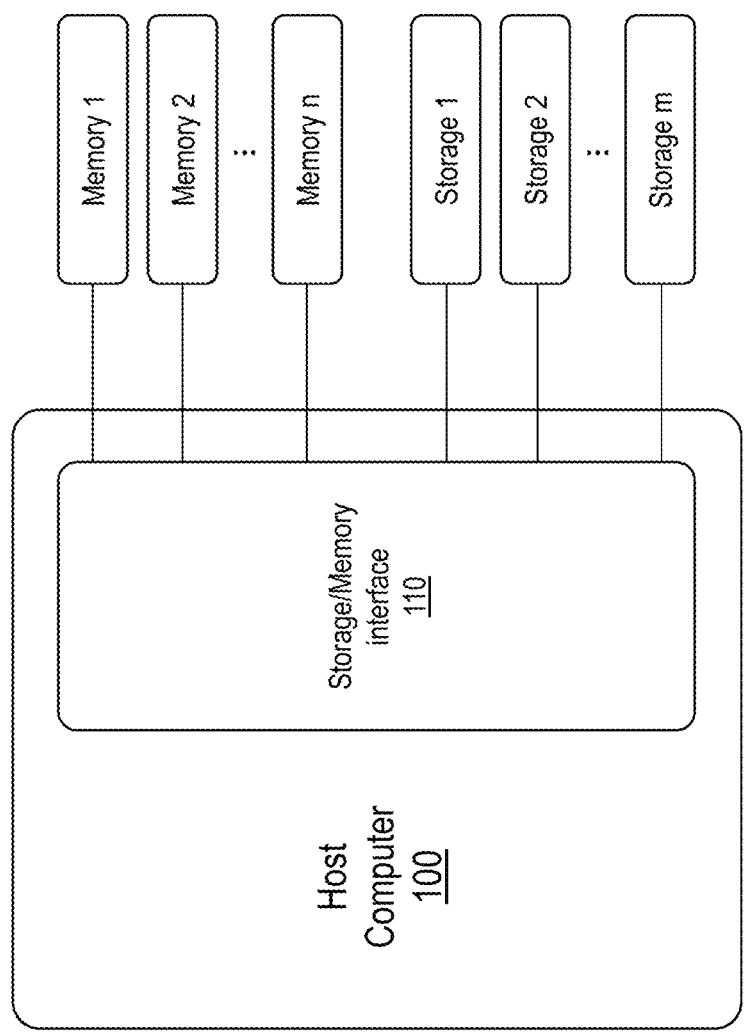
FIG. 1 shows an example of such a generic transaction-based interface.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide a smart device for decentralized machine learning. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The required structure for a variety of the disclosed devices and systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The present disclosure provides a hybrid memory/storage module and a transaction-based interface to provide a universal memory/storage interface for the hybrid memory/storage module. The transaction-based interface can provide quality of service (QoS), buffering, and control for both the memory and storage in the same module. In addition, the present hybrid memory/storage module and interface can achieve dynamic bandwidth partitioning through a QoS control of the host interface and achieve higher memory and storage bandwidth availability. Further, the present hybrid memory/storage module and interface can improve the system bandwidth utilized by page faults that allocates free memory pages from the same hybrid module that contains the required data.

Figure 2:
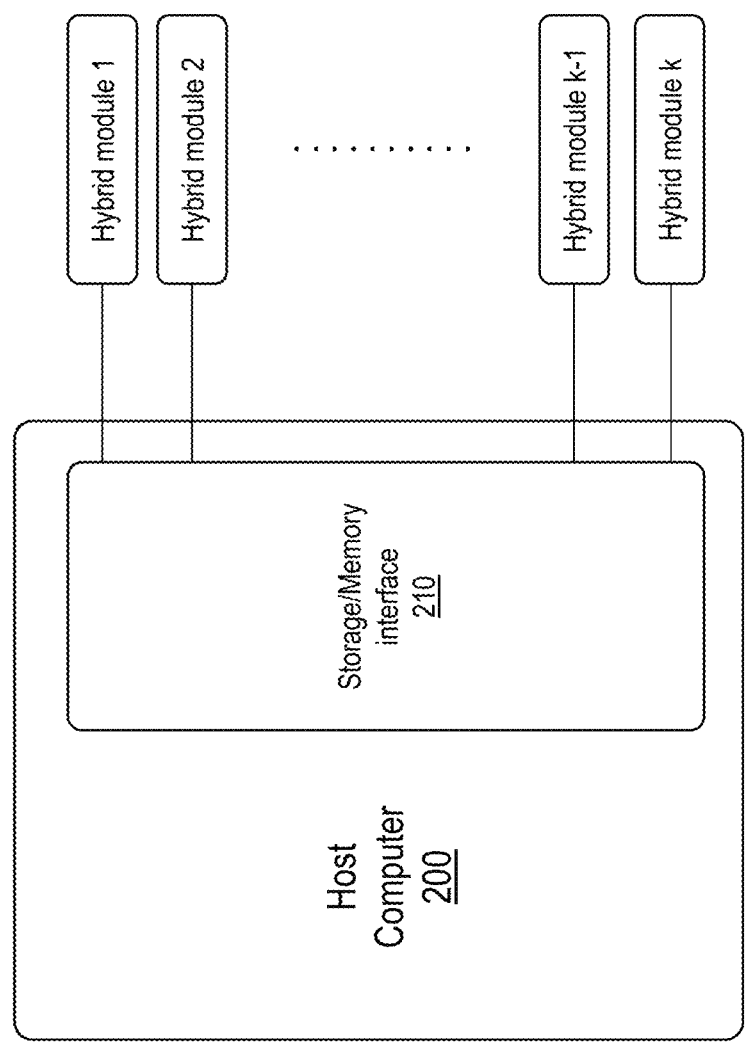
FIG. 2 shows an example of a transaction-based interface for hybrid memory/storage modules, according to one embodiment.

FIG. 2 shows an example of a transaction-based interface for hybrid memory/storage modules, according to one embodiment. The transaction-based interface provides a total of k interface links for hybrid modules 1-k. In one embodiment, each of the hybrid modules can include one or more memory modules and one or more storage modules. In another embodiment, each of the hybrid modules can be configured to function as one of a memory module and a storage module. The transaction-based interface provides a universal interface link regardless of the type and/or configuration of the coupled hybrid module.

According to one embodiment, the hybrid module including both memory and storage modules on a single device or a single module provides a universal host interface. The universal host interface is capable of handling cache management, flow control, and static RAM (SRAM) cache tags and buffers. The memory and storage modules can operate independently in the memory and storage address spaces. Compared to a memory system including separate memory and storage modules, as shown in FIG. 1, the present hybrid module can provide better dynamic bandwidth partitioning and bandwidth conservation during page faults. The present hybrid module can simultaneously monitor the memory bandwidth as well as the storage bandwidth, and dynamically partition and allocate the resources appropriately based on the dynamic usage of the memory bandwidth and the storage bandwidth. For example, the present hybrid memory module can prioritize memory transactions over storage transactions to ensure QoS policies. The present hybrid module can employ QoS policies to dynamically respond to the demands for memory and storage transactions for various applications and under various operating conditions.

Dynamic random-access memory (DRAM) and flash memory may be used together in a transaction-based hybrid memory module. DRAMs provide high performance so that DRAMs are typically used as front-end cache to a host computer system. Flash memories are denser, consume less power, and cheaper than DRAMs; therefore flash memories are used as a back-end memory and storage for saving permanent data.

FIG. 3 shows an example architecture of a hybrid memory module, according to one embodiment. The hybrid module 300 includes a memory module 310 and a storage module 320. The hybrid module 300 can be used as a memory device, a storage device, or an integrated memory and storage device. The memory module 310 includes one or more memory devices 311 and a memory controller 312. The storage module 320 includes one or more storage devices 321 and a storage controller 322.

According to some embodiments, the hybrid module 300 can integrate one or more memory modules 310 (e.g., one dynamic random-access memory (DRAM) and one phase-change RAM (PRAM)) and one or more storage modules 320 (e.g., one flash and one resistive RAM (ReRAM)) into the same device or module. Each of the memory modules 310 and storage modules 320 can have a dedicated memory/storage controller or two or more memory and storage modules can share a single memory/storage controller.

According to one embodiment, the memory module 310 can include one or more DRAMs, and the storage module 320 includes one or flash memory devices. However, it is understood that the memory module 310 could also be of any form of non-volatile memory such as a phase-change RAM (PRAM), a spin-transfer torque magnetic random access memory (STT-MRAM), resistive RAM (ReRAM), etc. Similarly, the storage module 320 can also be of any forms of non-volatile memory including PRAM, STT-MRAM, and ReRAM.

The hybrid module 300 can interface with a host computer (not shown) via a transaction-based interface 360. Unlike conventional hybrid memory/storage module, the hybrid module 300 may not include separate memory and storage interfaces. The host computer sends addresses of memory transaction requests to the memory module 310 via the transaction-based interface 360. For memory transactions, the memory module 310 can interface with the host computer in the memory address space. Similarly, the host computer also sends addresses for storage transaction requests to the storage module 320 via the transaction-based interface 360. For storage transactions, the storage module 320 can interface with the host computer in the storage address space. The memory devices 311 and the storage devices 321 operate differently. For example, DRAM is byte addressable whereas flash memory is block addressable.

Both the memory module 310 and the storage module 320 can interface with a host interface 350 of the hybrid module 300. The host interface 350 can include a main controller 351 and a request queue 352. The host interface 350 can internally interface with both the memory module 310 and the storage module 320, and externally interface with the host computer via a transaction-based interface 360. The memory transaction requests and the storage transaction requests received from the host computer are stored in the request queue 352. Memory transactions and storage transactions can have a shared request queue or have separate queues.

The main controller 351 of the host interface 350 places the memory and storage transaction requests in the request queue 352. For example, the requests in the request queue 352 and the associated address and/or data are stored in a first-in first-out (FIFO) buffer. The main controller 351 can send the transaction requests along with the address/data to the corresponding memory module 310 and the storage module 320 in the order the transaction requests are placed in the FIFO buffer. If necessary, the main controller 351 reorders the transaction requests in the FIFO buffer based on various conditions and/or criteria, for example, the priority of the received transaction requests and storage module activities.

According to one embodiment, the memory controller 312 can control the memory devices 311 (e.g., DRAMs), and the storage controller 322 can control the storage devices 321 (e.g., flash memory devices). Due to the differences in the operational characteristics of the memory devices 311 and the storage devices 321, the memory controller 312 and the storage controller 322 can perform different activities in addition to reading, writing, modifying data of the respectively coupled memory devices 311 and storage devices 321. For example, the flash memory requires wear-leveling and garbage collection, whereas DRAM memory requires refresh, which each may be performed by their respective controllers, as discussed below.

The main controller 351 can handle concurrency management, flow control, and ensure that QoS policies are met. When the memory module 310 and the storage module 320 concurrently operate and share common data, the consistency of the data can be violated in certain situations. In such cases, the main controller 351 provides concurrency management to maintain consistent and correct operation of the memory module 310 and the storage module 320 in conflicting situations, and control data flow between the memory module 310 and the storage module 320. The main controller 351 can provide operation consistency and correctness by controlling data flow without reducing performance to ensure QoS policies. For example, the main controller 351 can prioritize memory transactions over storage transactions.

In addition to performing transaction requests targeted for the memory device 311, the memory controller 312 can handle normal memory functions for the memory devices 311, such as refreshes, scheduling, error-correcting code (ECC), and maintenance. Similarly, the storage controller 322 can handle standard transaction requests targeted for the storage devices 321. The storage controller 322 can also perform device-specific operations for a flash memory such as scheduling, address translation, garbage collection, wear leveling, etc.

According to one embodiment, the hybrid module 300 can dynamically control QoS policies based on the available interface bandwidth. For example, the host interface 350 can control QoS policies based on the available interface bandwidth assigned to the memory module 310 and the storage module 320, respectively.

The host interface 350 can monitor a first bandwidth assigned for the memory module 310 and a second bandwidth assigned for the storage module 320. If the sum of the bandwidth assigned for the memory module 310 and the storage module 320 is lower than an available interface bandwidth, i.e., the maximum interface bandwidth has not yet been reached, the host interface 350 can provide the bandwidth requested by the host computer to the memory module 310 and the storage module 320 on demand. If the sum of the bandwidth assigned for the memory module 310 and the storage module 320 is higher than the available interface bandwidth, i.e., the maximum interface bandwidth has reached, the host interface can prioritize the requests from the host computer to meet the QoS policies. For example, the host interface can prioritize the memory transaction over the storage transactions, in which case the higher value memory bandwidth can always be met.

According to one embodiment, the hybrid module 300 can provide dynamic bandwidth partitioning. The dynamic bandwidth partitioning provides enhanced memory and I/O bandwidth usage, and allows for higher memory and I/O bandwidth availability.

As a comparative example, a traditional memory system includes n interface links for n memory modules and m interface links for m storage modules. The traditional host interface has the maximum available bandwidth for the memory and storage modules as follows:

$$\text{maximum available memory bandwidth} = n \times BW; \text{ and}$$

$$\text{maximum available storage bandwidth} = m \times BW.$$

In other words, the maximum available bandwidth for each of the memory and storage modules are determined by the respective number of available interface links.

For the purpose of a comparative analysis, suppose that n+m hybrid modules are connected to a host computer via n+m interface links. Each interface link can have a maximum bandwidth BW. The maximum available memory bandwidth is determined as follows:

$$\text{maximum available memory bandwidth} = (n+m)BW; \text{ and}$$

$$\text{maximum available storage bandwidth} = (n+n) \times BW.$$

The maximum available memory bandwidth and the maximum available storage bandwidth for the present hybrid modules are higher than the maximum available bandwidth that the traditional host interface can offer because the hybrid module 300 can provide dynamic bandwidth partitioning. The maximum available bandwidth for each of the memory and storage modules are determined by the total number of available interface links n+m including the interface links assigned for the memory modules and the storage modules.

Figure 4B:
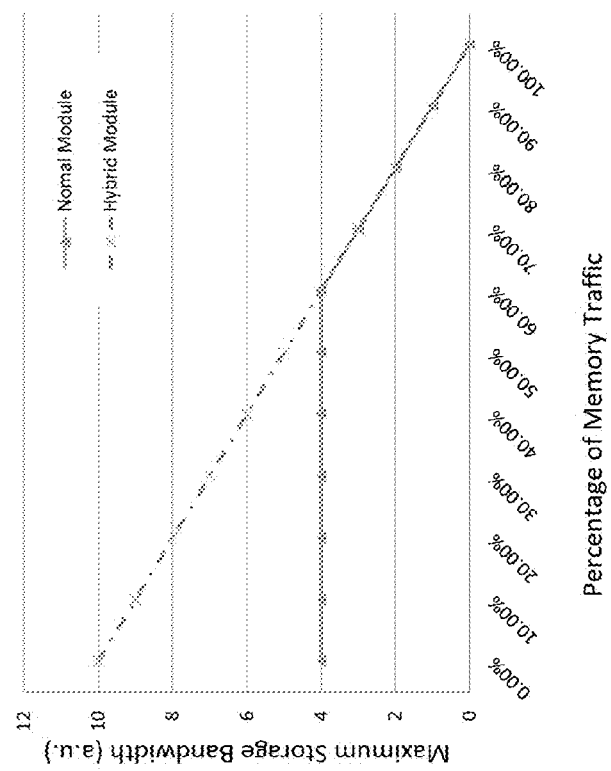
FIGS. 4A and 4B show a comparative analysis of maximum available bandwidths for memory modules and storage modules, according to one embodiment.
Figure 4A:
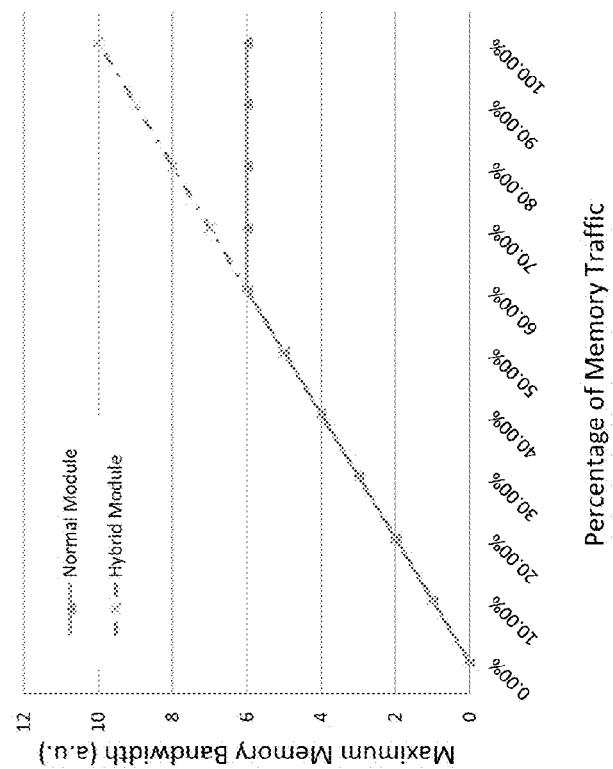

FIGS. 4A and 4B show a comparative analysis of maximum available bandwidths for memory modules and storage modules, according to one embodiment. The present example includes 10 hybrid modules, and the comparative example includes 6 memory modules and 4 storage modules. The x-axis of FIGS. 4A and 4B is the percentage of memory traffic targeted for the memory modules (e.g., DRAMs) as compared to the total traffic including the memory traffic targeted for the memory modules as well as the I/O traffic targeted for storage modules (e.g., flash memories). For example, 0% of memory traffic represents that the host transaction requests includes no memory transaction requests and only storage transaction requests. Similarly, 100% of memory traffic represents that the host transaction requests include only memory transaction requests and no storage transaction requests.

Generally, the maximum bandwidth for the memory modules increases and the maximum bandwidth for the storage modules decreases as the percentage of memory traffic increases. In the case of traditional host interface, the bandwidth for the memory modules increases as the percentage of memory traffic increases while the maximum bandwidth for the storage modules remains a constant value until the memory traffic reaches a predetermined percentage, in this example, 60%. This is because the maximum available bandwidth for the storage modules is limited by the number of interface links designated for the storage modules. Even if an excess bandwidth is available that is assigned for the memory modules when the memory traffic is relatively low, the traditional host interface can utilize only the maximum available storage bandwidth that is only 40% (4 storage modules out of total 10 modules,) of the total available bandwidth of the traditional host interface. As the percentage of memory traffic further increases over 60%, the maximum bandwidth for the memory modules remains a constant value as being limited by the interface links designated for the memory modules while the maximum bandwidth for the storage modules starts to decrease.

Compared to the comparative example, the maximum available bandwidth of the hybrid modules, whether each of the hybrid modules is configured as a memory module or a storage module, is proportional or disproportional to the memory traffic. Referring to FIG. 4A, the maximum available memory bandwidth increases to the maximum capacity without being limited to the number of hybrid modules configured as memory modules. The bandwidth of the hybrid modules configured as storage modules is also available at its maximum capacity even when the memory traffic is slow, in the present example, in the range of 0 to 60% of the memory traffic.

Figure 5:
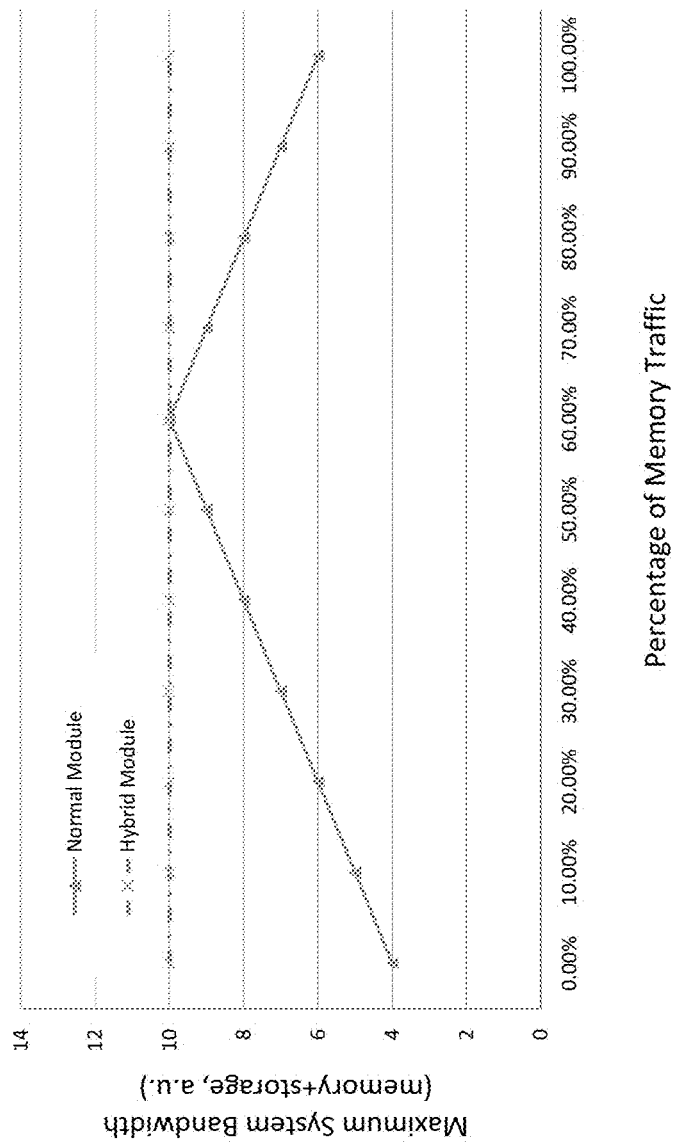
FIG. 5 shows a comparative analysis of maximum system bandwidth, according to one embodiment.

FIG. 5 shows a comparative analysis of maximum system bandwidth, according to one embodiment. The maximum system bandwidth represents the combined maximum memory bandwidth and maximum storage bandwidth. In the case of the comparative example, the maximum system bandwidth is achieved when the memory traffic is at 60% when the memory traffic can support the maximum memory bandwidth and the maximum storage bandwidth. For other cases of the memory traffic, i.e., lower than 60% or higher than 60%, the maximum system bandwidth is reduced from the maximum value. This is because either the maximum memory bandwidth or the maximum storage bandwidth is underutilized because of the predetermined proportion of the available interface links configured as memory modules and storage modules. In comparison, the maximum system bandwidth for the present host interface remains at its full capacity regardless of the memory traffic.

According to one embodiment, the present hybrid module can provide bandwidth saving during a page fault. A page fault occurs when a host computer accesses a memory page that is mapped into a virtual memory address space, not from the main memory such as a system cache.

For comparison, in the case of a traditional memory system including discrete memory modules and storage modules, a free page is allocated in the memory according to a page table. The host computer has to read data from the data storage into the memory. Therefore, two transactions are always required, one for the read from the data storage and another for the write to the memory.

In the present hybrid module, the memory and storage modules co-exist in the same module. Therefore, the present hybrid module can prioritize when allocating a free page from the memory available in the same module. If the free page from the same module can be successfully allocated, only one transaction is required because the memory write is performed within the same module. Therefore, the present hybrid module can achieve better memory performance than the traditional memory module. If the present hybrid memory module cannot allocate a free page from the same module, two transactions are still required but without extra overhead, and the memory performance of the hybrid module is expected to be as good as the traditional memory module.

According to one embodiment, the present hybrid memory system can redistribute data amongst the memories in the coupled hybrid modules during an idle time, to reduce the page fault overhead and therefore to achieve improved system performance. If the number of free memory pages in some of the hybrid modules is more than in other hybrid modules, the system may migrate some of the free pages from the hybrid modules that have more free pages to the hybrid modules that have less free pages. Since this free page migration requires extra read and write transactions to and from the module, the system may issue the migration requests during a system idle time to eliminate the performance overheads.

The present disclosure provides a hybrid module and a universal transaction-based interface for interfacing with the hybrid module. The hybrid module can have an integrated memory and storage module, for example, memory (DRAMs and/or NVMs) and storage (flash memories and/or NVMs). The universal transaction-based memory/storage interface can provide a generic transaction-based host interface to perform various activities including QoS, buffering, ECC, and controlling for both memory and storage modules available in the same module. The present hybrid module can achieve dynamic bandwidth partitioning through the QoS control of the host interface and can achieve higher memory and storage bandwidth availability. The present hybrid module can also improve the system bandwidth that may be otherwise affected by a page fault by allocating a free memory page from the same hybrid module that contains the required data.

According to one embodiment, a hybrid module can include one or more memory modules, each of which includes one or more memory devices and one or more memory controllers, and one or more storage modules, each of which includes one or more storage devices and a storage controller. A host interface of the hybrid module can include a main controller and provide an interface with the memory controller and the storage controller. A transaction-based memory interface can provide an interface between the main controller and a host memory controller.

The one or more memory devices can be one of DRAMs, PRAMs, and ReRAMs, and the memory controller can be one of a DRAM controller, a PRAM controller, and a ReRAM controller.

The one or more storage devices can be one of flash drives, PRAMs, and ReRAMs, and the storage controller can be one of a flash controller, a PRAM controller, and a ReRAM controller.

The main controller can be configured to perform concurrency management, flow control, and a quality of service (QoS) policy control.

The main controller can be further configured to prioritize transaction requests received from the host memory controller based on an available interface bandwidth.

The main controller can be configured to apply dynamic bandwidth partitioning based on a memory and storage traffic.

The main controller can be configured to prioritize memory transactions over storage transactions.

The main controller can be configured to allocate a free page from the one or more memory devices.

A system can include two or more hybrid modules, and a system controller can be configured to distribute memory or storage content between the two or more hybrid modules during a system idle time.

According to one embodiment, a method for providing a universal transaction-based memory interface can include: receiving a memory transaction requests for a memory module from a host computer; receiving a storage transaction request for a storage module from the host computer; performing the memory transaction request and the storage transaction request; and providing a host interface for interfacing with a host memory controller of the host computer via a transaction-based memory interface. The memory module and the storage module can be collocated in a single module.

The memory module can include one or more memory devices and a memory controller, and the storage module can include one or more storage devices and a storage controller.

The one or more memory devices can be one of DRAMs, PRAMs, and ReRAMS, and the memory controller can be one of a DRAM controller, a PRAM controller, and a ReRAM controller.

The one or more storage devices can be one of flash drives, PRAMs, and ReRAMS, and the storage controller can be one of a flash controller, a PRAM controller, and ReRAM controller.

The method can further include performing concurrency management, flow control, and a quality of service (QoS) policy control.

The method can further include prioritizing transaction requests received from the host memory controller based on an available interface bandwidth.

The method can further include applying dynamic bandwidth partitioning based on a memory and storage traffic.

The method can further include prioritizing memory transactions over storage transactions.

The method can further include allocating a free page from the one or more memory devices.

The method can further include distributing memory and storage content into one or more hybrid modules during a system idle time.

The above example embodiments have been described hereinabove to illustrate various embodiments of implementing a hybrid module including both memory and storage modules and a universal transaction-based memory/storage interface for interfacing with the hybrid module. Various modifications and departures from the disclosed example embodiments will occur to those having ordinary skill in the art. The subject matter that is intended to be within the scope of the present disclosure is set forth in the following claims.

What is claimed is:

1. A hybrid module comprising:
   a memory module including one or more memory devices and a memory controller;
   a storage module including one or more storage devices and a storage controller; and
   a host interface interfacing with the memory controller and the storage controller, wherein the host interface includes a main controller,
   wherein the one or more memory devices and the one or more storage devices have different physical structures and different operational characteristics, and
   wherein the hybrid module is configured to asynchronously interface with a host memory controller via a transaction-based memory interface.

2. The hybrid module of claim 1, wherein the one or more memory devices are DRAMs, and the memory controller is a DRAM controller.

3. The hybrid module of claim 1, wherein the one or more storage devices are one of flash drives, PRAMs, and ReRAMs, and the storage controller is one of a flash controller, a PRAM controller, and a ReRAM controller.

4. The hybrid module of claim 1, wherein the main controller is configured to perform concurrency management, flow control, and a quality of service (QoS) policy control.

5. The hybrid module of claim 4, wherein the main controller is further configured to prioritize transaction requests received from the host memory controller based on an available interface bandwidth.

6. The hybrid module of claim 1, wherein the main controller is configured to apply dynamic bandwidth partitioning based on a memory and storage traffic.

7. The hybrid module of claim 6, wherein the main controller is configured to prioritize memory transactions over storage transactions.

8. The hybrid module of claim 1, wherein the main controller is configured to allocate a free page from the one or more memory devices.

9. A system comprising two or more hybrid modules, wherein each of the hybrid modules includes:
   a memory module including one or more memory devices and a memory controller;
   a storage module including one or more storage devices and a storage controller; and
   a host interface interfacing with the memory controller and the storage controller,
   wherein the host interface includes a main controller,
   wherein the one or more memory devices and the one or more storage devices have different physical structures and different operational characteristics,
   wherein the hybrid module is configured to asynchronously interface with a host memory controller via a transaction-based memory interface, and
   a system controller configured to distribute memory or storage content between the two or more hybrid modules during a system idle time.

10. A method comprising:
providing a host interface for interfacing a hybrid module including a memory module and a storage module with a host memory controller of a host computer via a transaction-based memory interface, wherein the host interface includes a main controller;
asynchronously receiving a memory transaction request for the memory module from the host computer via the transaction-based memory interface;
asynchronously receiving a storage transaction request for the storage module from the host computer via the transaction-based memory interface;
placing the memory transaction request and the storage transaction request in a transaction queue;
sending the memory transaction request to a memory controller of the memory module;
sending the storage transaction request to a storage controller of the storage module,
wherein the one or more memory devices and the one or more storage devices have different physical structures and different operational characteristics, and
wherein the memory module and the storage module are collocated in a single module.

11. The method of claim 10, wherein the memory module includes one or more memory devices and a memory controller, and wherein the storage module includes one or more storage devices and a storage controller.

12. The method of claim 11, wherein the one or more memory devices are DRAMs, and the memory controller is a DRAM controller.

13. The method of claim 11, wherein the one or more storage devices are one of flash drives, PRAMs, and ReRAMs, and the storage controller is one of a flash controller, a PRAM controller, and a ReRAM controller.

14. The method of claim 11, further comprising performing concurrency management, flow control, and a quality of service (QoS) policy control.

15. The method of claim 11, further comprising prioritizing transaction requests received from the host memory controller based on an available interface bandwidth.

16. The method of claim 11, further comprising applying dynamic bandwidth partitioning based on a memory and storage traffic.

17. The method of claim 16, further comprising prioritizing memory transactions over storage transactions.

18. The method of claim 11, further comprising allocating a free page from the one or more memory devices.

19. The method of claim 11, further comprising distributing memory and storage content into one or more hybrid modules during a system idle time.

20. The method of claim 11, wherein the main controller is configured to send the memory transaction request received from the host memory controller via the transaction-based memory interface to the memory controller to access the one or more memory devices using a first addressing scheme, and
wherein the main controller is further configured to send the storage transaction request received from the host memory controller via the transaction-based memory interface to the storage controller to access the one or more storage devices using a second addressing scheme that is different from the first addressing scheme.

* * * * *